Oct. 2, 1956 N. L. FULTON ET AL 2,764,826
PORTABLE ILLUMINATED ROLL-TYPE MAP
Filed Jan. 27, 1953 2 Sheets-Sheet 2
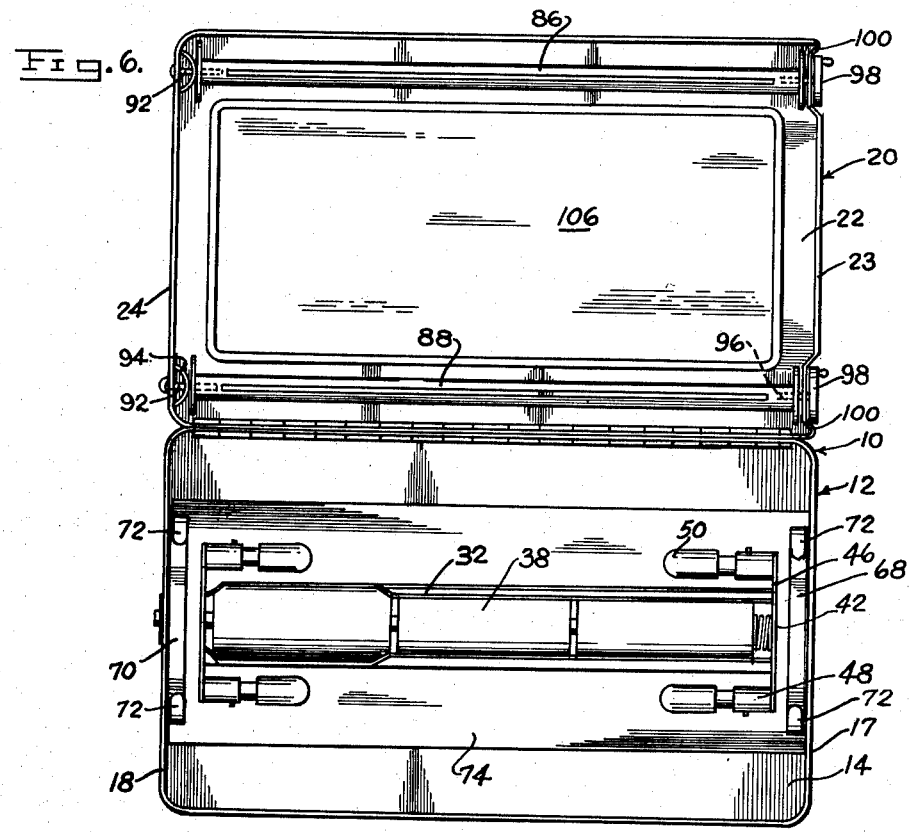
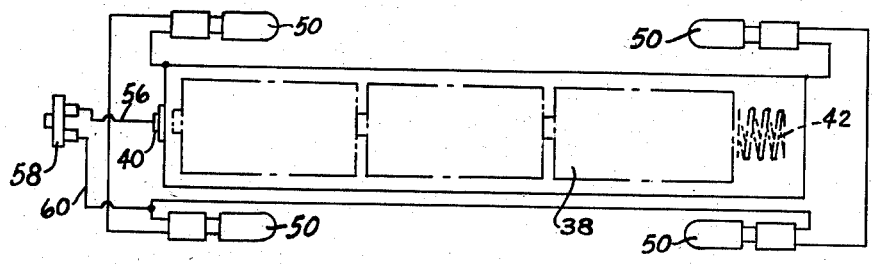
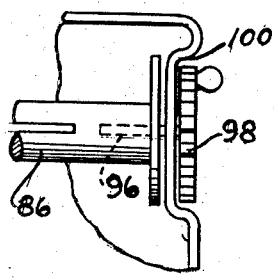
INVENTORS
NELL FULTON &
CHARLES W. KNIGHT
BY
ATTORNEYS United States Patent Office 2,764,826
Patented Oct. 2, 1956

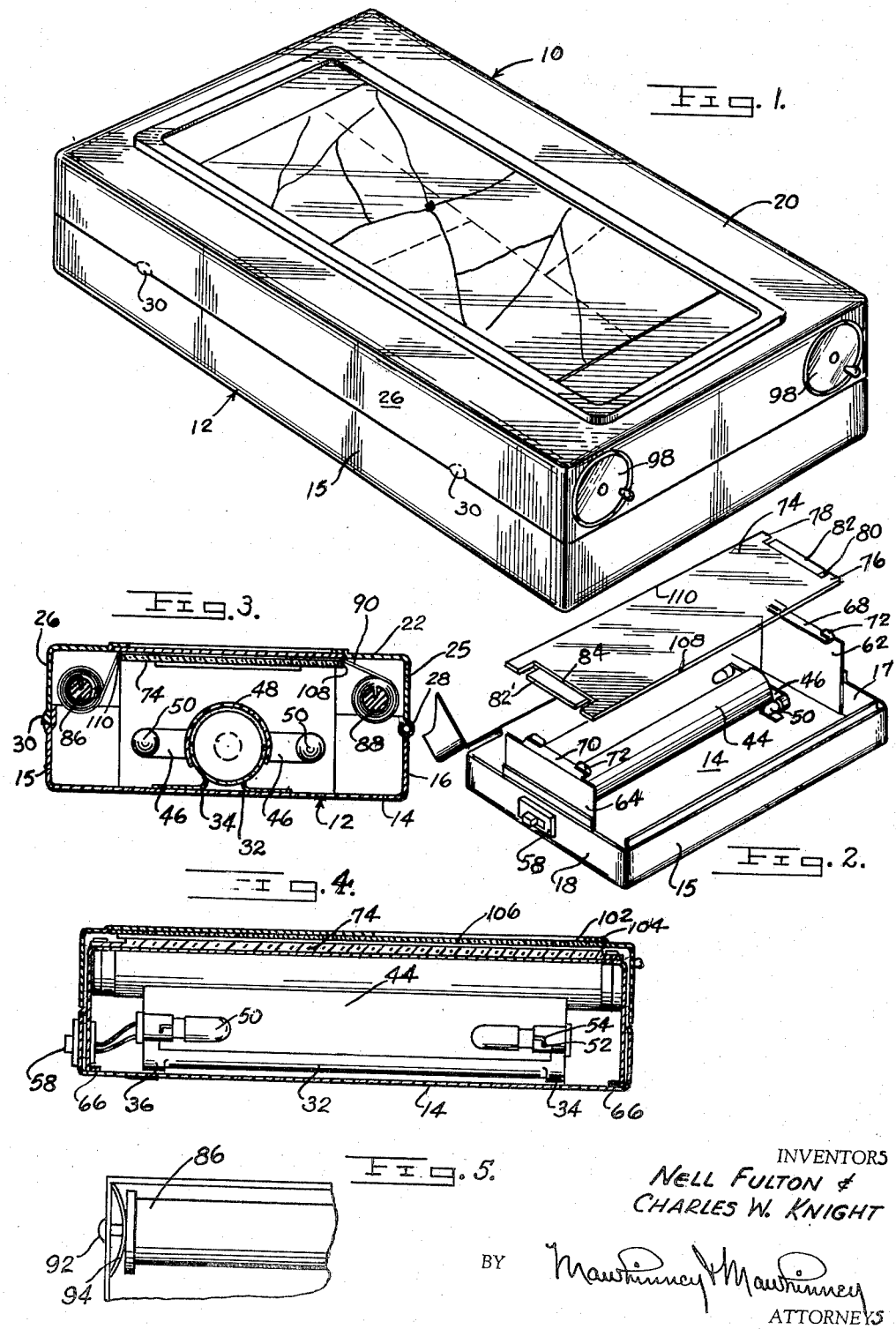

2,764,826

PORTABLE ILLUMINATED ROLL-TYPE MAP

Nell L. Fulton and Charles William Knight,
North Hollywood, Calif.

Application January 27, 1953, Serial No. 333,534

2 Claims. (Cl. 40—86)

This invention appertains to improvements in portable maps and has for a primary object to provide an illuminated roll form map which is mounted in a small casing that serves as a convenient accessory for automobile traveling and can be stored, when not in use, in the glove compartment of the automobile.

Another object of this invention is to provide a sectionized map of the United States, particular State or city, which map is in rolled form and to provide means for mounting the map in a casing in a manner so that any desired portion thereof is viewable through a window in the casing.

Another object of this invention is to provide a pair of rollers for propelling a long strip of transparent paper upon which a desired map is printed past an opening in a casing and to provide a resilient translucent backing plate for the spanning portion of the map between the rollers, the backing plate cooperating with a transparent window in the casing to hold the spanning portion of the map taut. The backing plate also serves to guide the map between the rollers and prevent the map from becoming misaligned and torn or otherwise damaged.

A further object of this invention is to provide illuminating means, which is disposed underneath the spanning portion of the map, for directing light rays through the spanning portion of the map, so that the map is easily readable at night, the backing plate being frosted to reduce the glare from the illumination unit.

A further object of this invention is to provide a compact sectional casing, in one section of which batteries and bulbs and the backing plate are mounted and the other section of which the rollers are mounted on which the map is wound, the two sections being hingedly connected together and having a locking means for holding them in closed position.

A still further object of this invention is to provide a small casing, which can be held in one hand, while the rollers are rotated by the other hand, both of the rollers being rotatable in a clockwise direction with the map extending over one roller, passing over the backing plate and under the other roller.

Thus, an important feature of this invention resides in the cooperation between the resilient backing plate and the arrangement of the map on the rollers so that the spanning portion of the map is taut at all times.

These and ancillary objects and additional structural features of merit are attained by this invention, the preferred embodiment of which is set forth in the following description and illustrated in the accompanying drawings, wherein:

Figure 1 is a view in perspective of a portable map, constructed in accordance with the principles of this invention;

Figure 2 is an exploded perspective view of the bottom section of the casing and the parts mounted therein;

Figure 3 is a transverse sectional view of the map casing with the sections in closed position;

Figure 4 is a longitudinal sectional view thereof;

Figure 5 is a detailed elevational view of one end of one of the rollers, illustrating a spring means to prevent unwinding of the roller;

Figure 6 is a top plan view of the casing, with the sections in open position;

Figure 7 is a schematic view of the wiring arrangement for the illumination means, and, Figure 8 is a detailed sectional view of the recessed handle arrangement for the rollers.

Referring now more particularly to the accompanying drawings, the portable map includes a sectional casing, which may be formed from any suitable metallic or plastic material. The casing 10 includes a rectangular bottom section 12, which comprises a bottom wall 14 having upstanding side walls 15 and 16 and end walls 17 and 18. The casing also includes a cover or top section 20, which has a top wall 22, end walls 23 and 24 and side walls 25 and 26. The adjoining side walls 16 and 25 of the bottom section 12 and the cover section 20 have their adjoining edges bent together to form a hinge connection 28 and the side walls 15 and 26 are provided with friction catches 30 to securely lock the two sections together.

Illumination means is mounted in the bottom section 12 of the casing and may include a battery and bulb arrangement or, if the casing is attached as a permanent fixture in an automobile, the ignition circuit of the automobile may be substituted for the batteries and used as the source of power for illumination. As illustrated in Figures 2 and 6, the illumination means include a trough-like battery cradle 32, which has supporting feet 34 and 36 at its opposite ends that are suitably secured to the bottom wall 14. Conventional dry cell batteries 38 are mounted in a bank in the cradle and held against the contact 40 by the spring 42. A U-shaped cover 44 is provided to seat on the cradle and enclose the batteries. The cradle 32 and cover 44 form a split cylindrical housing for the batteries, so that the batteries are securely retained and yet are easily removed.

Extending laterally from the ends of the cradle 32 are arms 46, which support spring type lamp sockets 48 in which lamps 50 are positioned and held in place by pins 52 engaged in bayonet slots 54 in the sockets.

As illustrated in Figure 7, one set of lamps is disposed at one end of the battery housing and the other set is disposed at the opposite end of the battery housing, the sets being wired in parallel. From the contact 40, a lead 56 extends to a push button switch 58, which is mounted in the end wall 18, the conductor 60 extending from the switch to the main line. The switch 58 is positioned on the end wall 18 for easy accessibility, so that the illumination means can be easily controlled.

Supports 62 and 64, in the form of plates, are mounted perpendicularly on the bottom wall 14 by means of flanges 66 formed on the lower edges thereof, which are suitably secured to the bottom wall 14. The supports 62 and 64 are disposed at the end walls 17 and 18 and extend above the end walls and terminate in inwardly extending flanges 68 and 70. The flanges 68 and 70 lie in the same plane and have their ends slit or separated from the supports. The ends are bent over to overlie the flanges and provide fixed clamps 72 at each end of each of the flanges 68 and 70.

The supports 62 and 64 and their associated clamping flanges 68 and 70 are provided to releasably support a resilient backing plate 74, which is provided to hold the portion of the roll map between the rollers taut at all times. The plate 74 is removably mounted to afford access to the illumination unit for the purpose of removing a battery or one of the bulbs.

The backing plate 74 is translucent and may be formed from Lucite or some equally luminous plastic.

The backing plate possesses some resiliency and is mounted at its ends on the flanges 68 and 70.

For this purpose, the ends of the plate are bifurcated, so that bifurcations 76 and 78 are formed at each end, the bifurcations being positioned at the ends of the flanges 68 and 70, outside of the clamps 72. Spaced from the bifurcations by slits or cut-out portions 80 and extending from each end are tongues 82, which are adapted to slide on the flanges 68 and 70 beneath the clamps. One of the tongues, such as the tongue 82′, illustrated in Figure 2, is wider than the other tongue, so that the backing plate 74 may be easily attached to the flanges 68 and 70 by sliding the tongue 82′ on the flange 70, until the end of the tongue 82 can be moved vertically into its proper position for insertion between the flange 68 and the clamps 72.

The tongues are of a reduced thickness from the plate 74, so that shoulders or stops 84 are provided, which shoulders abut against the clamps 72 and limit the axial movement of the plate.

The cover 20 houses the rollers 86 and 88, which carry the roll map 90. The map 90 is formed from paper, on which a desired map is printed. For example, the United States is printed on the map in sections, with an index at one end of the map or the index could be continued down one side of the map strip. Any suitable paper may be used, lightness of weight and strength being important factors, as well as light diffusion. Preferably, the paper should be as white as possible for daylight reading.

The rollers 86 and 88 are rotatably mounted on the end wall 24 by pins 92 and bowed springs 94 having their ends engaging the inner surface of the end wall and their center bearing against the ends of the rollers are provided to avoid undesired, accidental rotation of the roller. Of course, any suitable ratchet means may be provided for accomplishing the same purpose. The pins 96, which journal the other ends of the rollers 86 and 88 to the end wall 23 are provided with handles 98. The handles 98 are disposed in recesses 100 formed in the end wall 23. The handles are indented into the side wall 23 of the cover to prevent damage thereto and also to prevent the handles from catching on the upholstery of the automobile or the like. By indenting the handles, it will be noted that there are no projections on the casing.

As shown in Figures 1 and 4, the top wall 22 of the cover section 20 is formed with an opening 102 and a frame 104 surrounds the opening to receive the edges of a transparent window 106 that is attached to the frame so as to enclose the opening.

As illustrated in Figure 3, the map rolls over the roller 88 and under the roller 86. The spanning portion of the map between the rollers 86 and 88 is diverted from its natural path by the backing plate 74, which lies above the rollers, when the sections 12 and 20 are locked together by the friction catches 30. The backing plate is spaced slightly from the window 106 and the edges 108 and 110 thereof are rounded, so as to reduce to a minimum any frictional resistance to the sliding of the map over the upper surface thereof. Both of the rollers are rotated clockwise and either of the rollers may be rotated to move the map over the backing plate 74, the roller to be used depending upon the location of the desired portion of the map. The backing plate 74 is spaced slightly, as shown in Figure 3, from the window 106 and holds the map 90 taut between the rollers 86 and 88. It also functions as a guide to prevent the map from becoming misaligned between the rollers and, thereby, insures against breaking or tearing of the map.

The map casing is small and compact and may be stored, when not in use, in the glove compartment of an automobile. When it is used, it can be held in one hand, while the other hand can be used to rotate the rollers. The hand holding the map can easily control the illumination through the switch 58.

It can thus be seen that a very attractive and simple map is provided, which makes possible the easier scanning of road and street maps, especially at night. It completely eliminates the drawbacks associated with folding maps, and makes map reading a pleasant procedure instead of a chore. The compact box-like arrangement and the smooth-running rapidly operating mechanism that propels the long strip of transparent paper 90 makes for an efficient and convenient map arrangement.

While the best known form of this invention has been illustrated and described, it is obvious that other forms may be made so that limitation is sought only in accordance with the appended claims.

What is claimed as new is:

1. In a map device, a casing, a roll map, a pair of spaced rollers carried by the casing and supporting the map for movement therebetween, a pair of vertical parallel spaced confronting supports on the casing, inwardly extending lateral flanges on the upper edges of the supports, said flanges having free ends which are bent inwardly to overlie the flanges and form fixed clamps, a resilient backing plate for supporting the roll map in its movement between said rollers, and means formed on the ends of the plate engageable with said clamps to lock the plate in position between the supports, said last means including bifurcated ends on the plate, the bifurcations on each end extending outwardly of the clamps, and tongues on the ends of the plate extending axially therefrom and spaced from the bifurcations to slide on the flanges and under the clamps, said tongues being movable axially onto the flanges.

2. A portable map comprising a casing, a pair of spaced parallel rollers rotatably mounted in the casing, a transparent roll map mounted on the rollers, said casing having an opening between the rollers to expose the portion of the map between the rollers to view, resilient means backing said portion of the map between the rollers to hold it taut, illumination means mounted in the casing beneath the portion of the map between the rollers to illuminate the resilient means and map, said resilient means including a translucent backing plate frosted to reduce the glare from the illumination means on the casing and means to mount the plate so that the map passes over the plate and is diverted from its natural path between the rollers and held taut, said illumination means including a fixed battery cradle for receiving batteries, a removable cover enclosing the batteries and slidably engaging the cradle, brackets extending laterally from the ends of the cradle, and lamp sockets on said brackets.

References Cited in the file of this patent

UNITED STATES PATENTS

| | | |
|---|---|---|
| 1,269,217 | Henning | June 11, 1918 |
| 1,443,558 | Bloomfield | Jan. 30, 1923 |
| 1,569,946 | Buettner | Jan. 19, 1926 |
| 1,700,461 | Wigand | Jan. 29, 1929 |
| 1,711,850 | Lake | May 7, 1929 |
| 1,976,759 | Yanga | Oct. 16, 1934 |
| 2,548,488 | Mella | Apr. 10, 1951 |
| 2,631,390 | Dorogoff | Mar. 17, 1953 |
| 2,637,923 | Taddonio | May 12, 1953 |

FOREIGN PATENTS

| | | |
|---|---|---|
| 150,758 | Switzerland | Nov. 15, 1930 |
| 922,182 | France | Jan. 27, 1947 |